Dec. 22, 1936.  J. H. TAYLOR  2,065,035
VALVE HOUSING AND METHOD OF MAKING SAME
Filed April 22, 1935  6 Sheets-Sheet 1

Inventor.
James Hall Taylor

Inventor:
James Hall Taylor
By: Brown, Jackson, Boettcher & Dienner.
Attys.

Dec. 22, 1936.  J. H. TAYLOR  2,065,035

VALVE HOUSING AND METHOD OF MAKING SAME

Filed April 22, 1935  6 Sheets-Sheet 3

Inventor:
James Hall Taylor
By: Brown, Jackson, Boettcher & Dienner
Attys.

Dec. 22, 1936.  J. H. TAYLOR  2,065,035
VALVE HOUSING AND METHOD OF MAKING SAME
Filed April 22, 1935  6 Sheets-Sheet 4
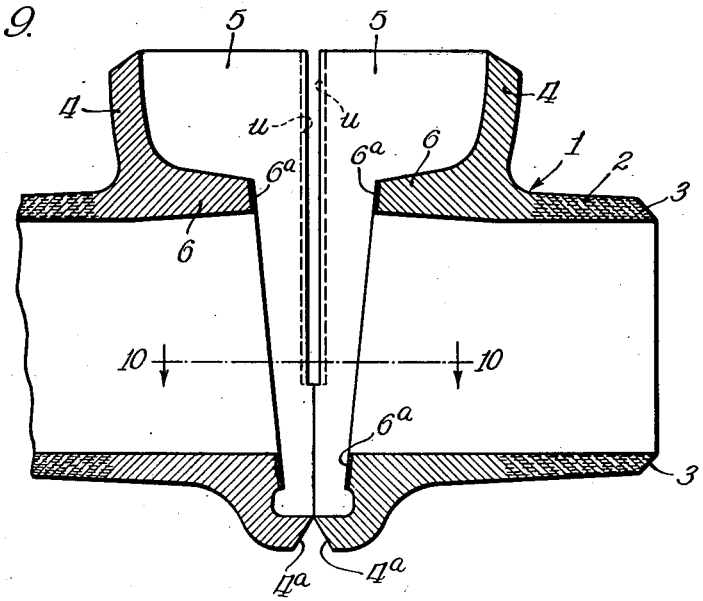
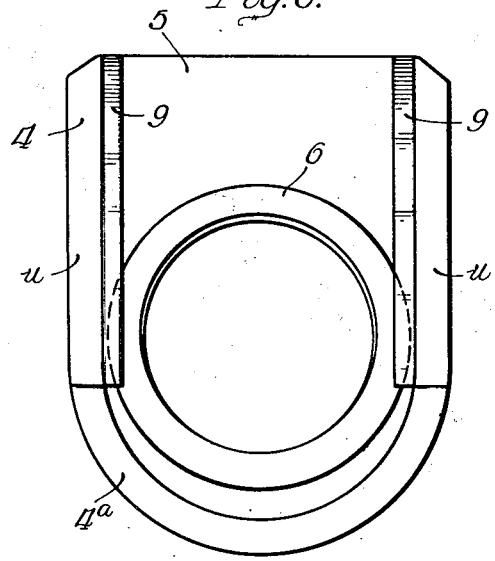
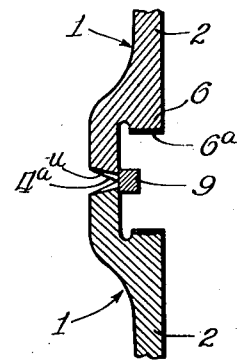
Inventor:
James Hall Taylor
By: Brown, Jackson, Boettcher + Dienner.
Attys.

Dec. 22, 1936.                J. H. TAYLOR                 2,065,035
            VALVE HOUSING AND METHOD OF MAKING SAME
                    Filed April 22, 1935        6 Sheets-Sheet 5
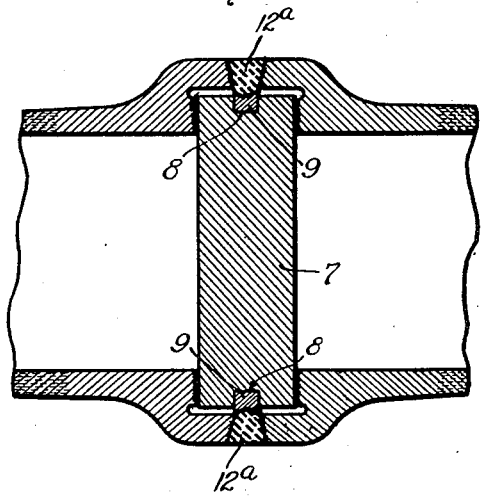
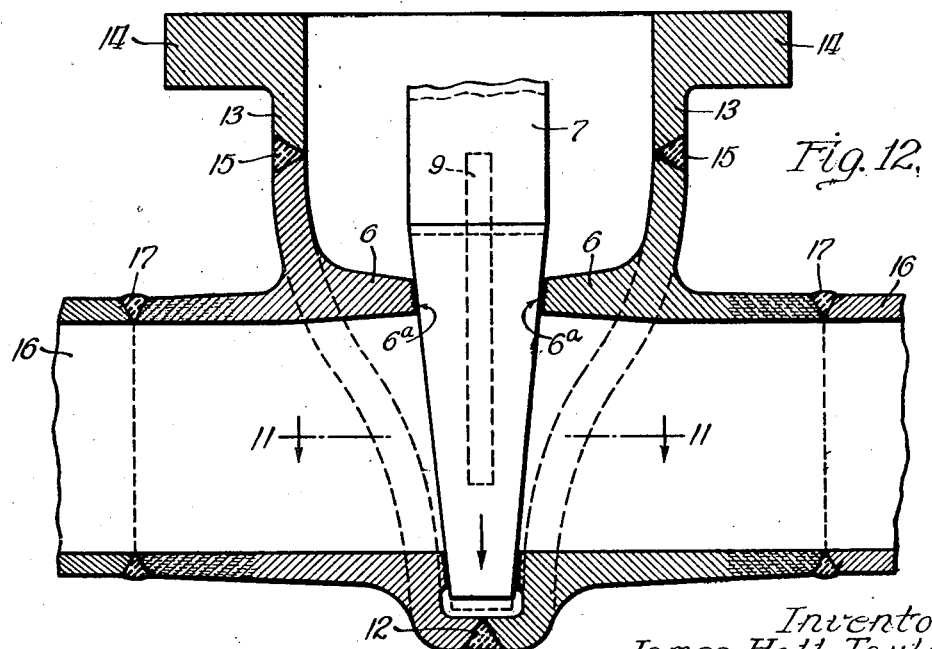
Inventor:
James Hall Taylor
By: Brown, Jackson, Boettcher & Dienner
Attys Dec. 22, 1936.   J. H. TAYLOR   2,065,035
VALVE HOUSING AND METHOD OF MAKING SAME
Filed April 22, 1935   6 Sheets-Sheet 6
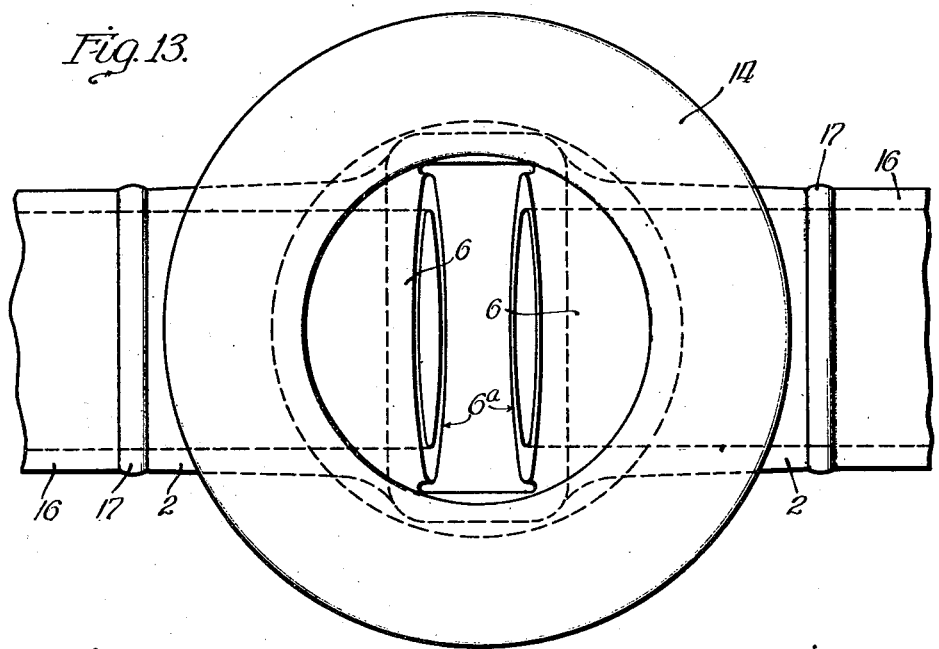
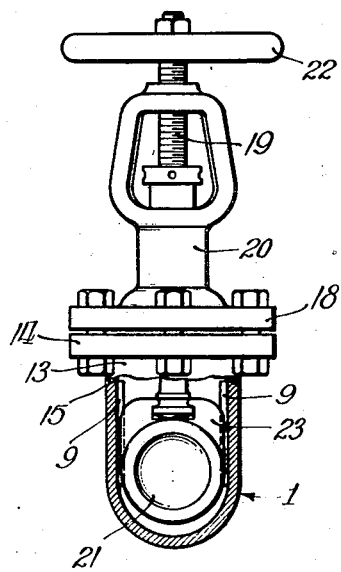
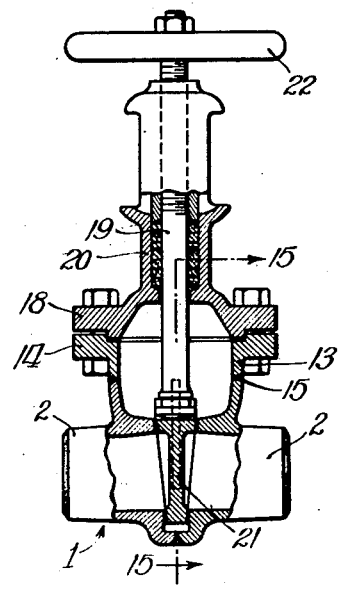
Inventor:
James Hall Taylor
By: Brown, Jackson, Boettcher & Dienner,
Attys.

Patented Dec. 22, 1936

2,065,035

UNITED STATES PATENT OFFICE 2,065,035

VALVE HOUSING AND METHOD OF MAKING SAME

James Hall Taylor, Oak Park, Ill.

Application April 22, 1935, Serial No. 17,655

11 Claims. (Cl. 29—157.1)

This invention relates to valve housings, and has to do with a gate valve housing of improved construction and an improved method for producing the housing.

In general, my invention is directed to a valve housing of simple construction, light weight and adequate mechanical strength, and to a method for producing the housing expeditiously and at low cost and which reduces the necessity of machining of parts to a minimum, while permitting facing of the valve seats, giving ready access to such parts as have to be machined and assuring accuracy in the seating surfaces of the valve seats and in the disposition of the valve guide strips. Further objects and advantages of my invention will appear from the detailed description.

In the drawings:—

Figure 8 is an inner end view of a housing section resulting from the forming and cutting operations of Figures 5 and 7, showing the valve guide strips in position;

Figure 9 is a fragmentary lengthwise central vertical sectional view of two housing sections positioned for welding together, the valve guide strips being omitted;

Figure 10 is a section taken substantially on line 10—10 of Figure 9, showing one of the valve guide strips in position;

Figure 11 is a sectional view taken substantially on line 11—11 of Figure 12;

Figure 12 is a lengthwise central vertical sectional view through a valve housing produced in accordance with my invention, illustrating the manner of welding together the housing sections;

Figure 13 is a plan view of the completed housing;

Figure 14 is a lengthwise vertical sectional view, on a reduced scale, showing the completed housing and the valve therein and associated means for operating the valve, parts being shown in elevation; and Figure 15 is a transverse sectional view of the completed housing and the valve and associated parts, taken substantially in the plane of line 15—15 of Figure 14, parts being shown in elevation.

Figure 1:
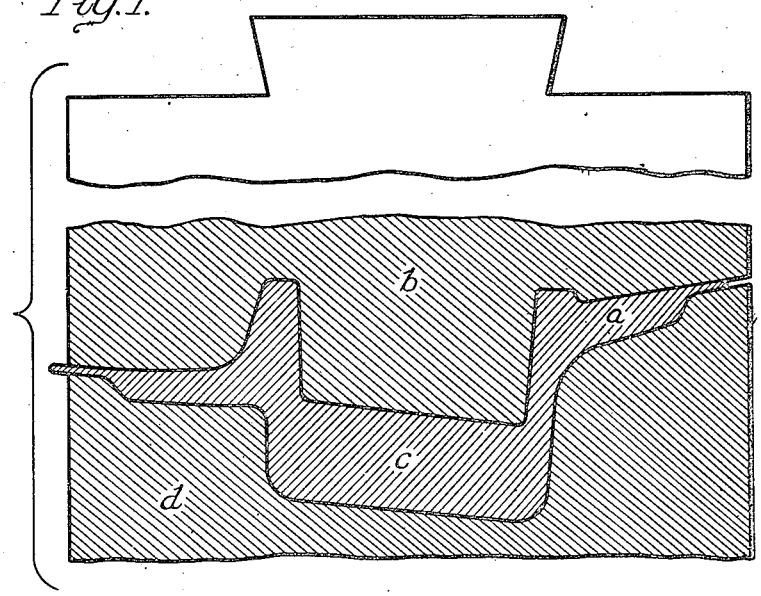
Figure 1 is a sectional view through two cooperating dies and a partially formed blank therebetween, illustrating a preliminary step in forging one of the sections of the housing in accordance with the method of my invention.
Figure 2:
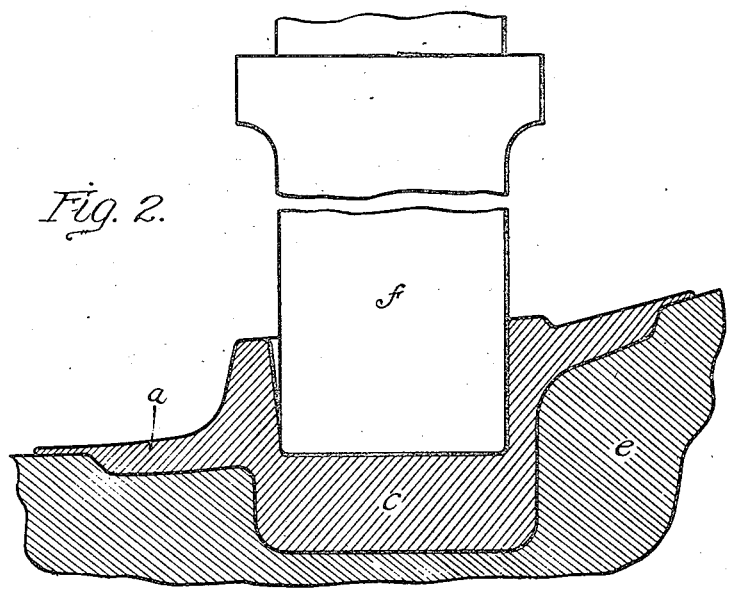
Figure 2 is a sectional view through the blank of Figure 1 and a die and a cooperating extruding punch positioned for performing a succeeding step in the forging of a section of the housing in accordance with my invention.

The valve housing is formed in two complementary sections which divide the housing at the median transverse plane thereof and are welded together at their inner ends. Preferably, the sections of the housing are formed by forging from steel or other metal suitable for the purpose. A billet of suitable size is first forged to produce a cup-like blank $c$ from which projects a flange $a$ inclined transversely of the blank, as shown in Figure 1. This is accomplished by suitably shaped cooperating upper and lower dies $b$ and $d$, respectively, having relative movement, one toward and away from the other, the upper die conveniently being the movable die. It will be noted that the recess formed in blank $c$ flares upward, as shown in Figure 1, and flange $a$ is of approximately semi-elliptical shape with its major axis extending transversely of the blank coincident with the diameter thereof which passes through the highest point of the flange. This will be clear from Figures 1 and 4. Blank $c$, formed in this manner, is then placed in a cooperating recess in a die $e$, and a cylindrical extruding punch $f$, of less diameter than the upper portion of the recess of blank $c$, is inserted downward into the blank $c$, which is so disposed that the punch $e$ is in contact with and parallel to the side of the recess of the blank adjacent the upper portion of flange $a$, as shown in Figure 2. The die $e$ of Figure 2 may be the die $d$ of Figure 1, positioned as in Figure 2, or it may be another die. The punch $f$ is then moved downward into the blank so as to extrude the metal thereof upward along punch $f$, between the latter and the confining wall of the recess of die $e$, as in Figure 3. In this manner, the blank c is extended so as to produce a relatively elongated hub h, the upper portion of which, at one side thereof, is inclined upward and outward away from punch f, as shown, the upper end of the hub being inclined transversely thereof in the same direction as, but to a less extent than, flange a, the lower end of the hub being closed by an integral disc g.

Figure 3:
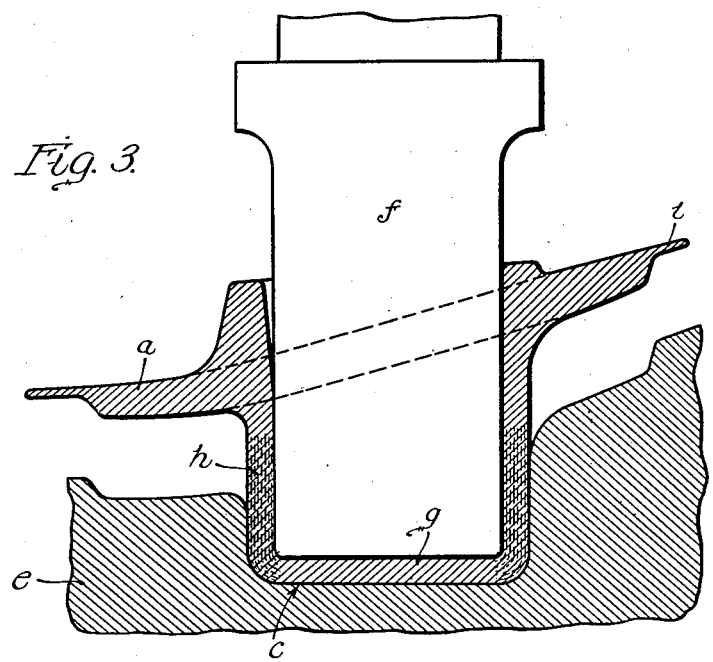
Figure 3 is a view similar to Figure 2 but illustrating the succeeding step performed by the extruding punch and die of the latter figure.

Due to this extruding operation, with resultant flow of the metal lengthwise of punch f, the grain of the metal is so disposed that the metal fibres extend lengthwise of the resulting forging, particularly of hub h from below flange a to the lower end of the hub, as indicated in Figure 3. Flash metal i is then removed from flange a, the resulting blank, viewed from its inner end, appearing as shown in Figure 4, from which it will be noted that flange a is of approximately semi-elliptical shape, as stated.

Figure 4:
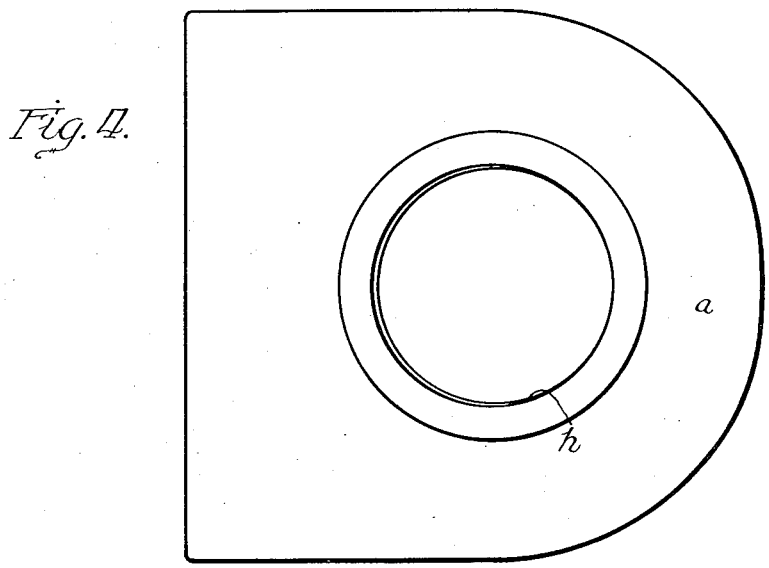
Figure 4 is an inner end view of one of the partially formed housing sections resulting from the step of Figure 3.
Figure 5:
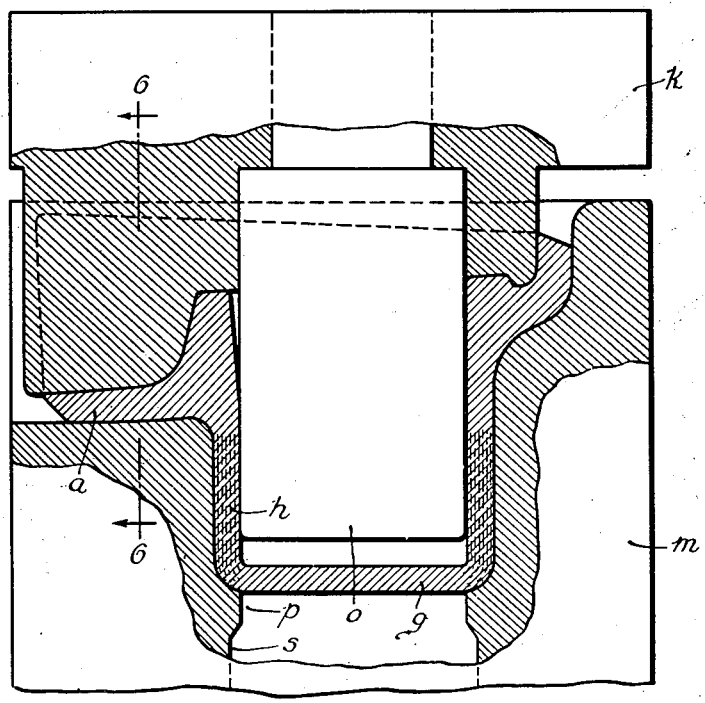
Figure 5 is a sectional view through a pair of forming dies and a blank being formed thereby, illustrating a further step of the method of my invention, parts being shown in elevation.
Figure 6:
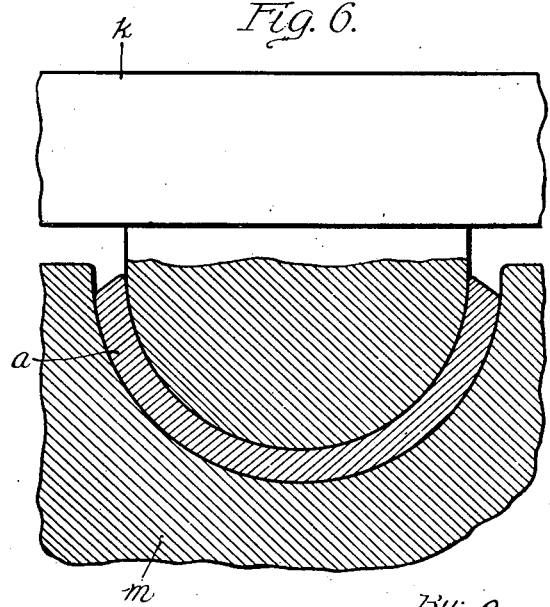
Figure 6 is a section taken substantially on line 6—6 of Figure 5, parts being shown in elevation.
Figure 7:
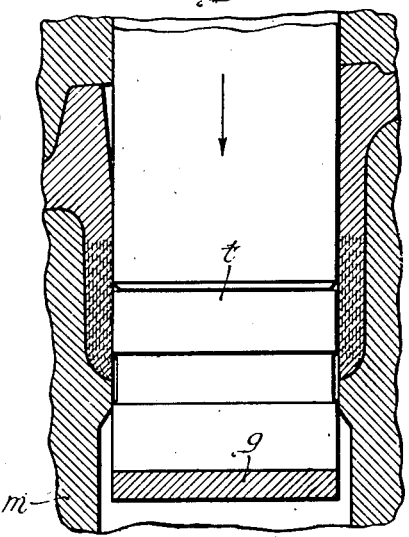
Figure 7 is a fragmentary sectional view similar to Figure 5, parts being shown in elevation, showing the use of the cutting die for removing the metal from the closed end of the partially formed housing section.

The blank shown in Figure 4 is then acted upon by upper and lower dies k and m, respectively, in such manner as to shape flange a to form one-half of the body of the desired housing, as in Figures 5 and 6. The upper die k has a depending guide stem o of a size to fit within hub h of the blank, with its lower end above disc g when the dies are closed, and the lower die is provided with a constriction p of the same diameter as the interior of hub h, and an opening s of greater diameter than and extending downward from constriction p. The dies k and m are then separated sufficiently to withdraw stem o from the blank and permit introduction of a cutting disc or die t into the hub h, after which the dies are again closed. In this second closing of the dies, stem o contacts cutting die t forcing the latter downward and thereby cutting disc g from the lower end of hub h, as in Figure 7. The housing section thus produced then has its inner edge notched out at each side at u, preferably by machining, for a distance extending downward approximately the length of a valve guide strip, as shown in Figures 8 and 9, and as will be hereinafter explained more fully. This notching may be effected in any other suitable manner and, if desired, may be performed during the forging operation of Figure 5, the dies being appropriately formed for this purpose, as will be readily understood by those skilled in the art.

I provide two housing sections 1, produced as above, each of which constitutes one-half of the valve housing and which, in the completed housing, are welded together at their inner ends, the line of weld corresponding to the transverse medium plane of the housing. Each of the sections 1 comprises a tubular hub 2, the outer end of which is beveled at 3 for welding to pipe ends, and a flange 4 integral with the hub and formed to provide one-half 5 of the body of the housing. Each section 1 also comprises an integral valve seat element 6 which projects inward beyond flange 4 and is disposed at a downward and inward inclination to the hub, as in Figure 9.

It is frequently necessary that the valve seat be provided with means for preventing wear and corrosion thereof. The inner end of each of the seat elements 6 constitutes a valve seat, and, in the housing of my invention, I apply a wear and corrosion resistant surface to each of the valve seats. This I do by welding onto the valve seat a layer 6a of a metal or alloy resistant to wear and, where necessary, corrosion, such as stellite. This layer is applied to the valve seat and is then accurately ground to the proper degree of smoothness, preliminary to securing together of the sections of the housing. The surfacing and finishing of the valve seats are thus performed under conditions which permit of ready access thereto, which is conductive to expedition and facility in the performance of this operation while providing accuracy thereof.

After sections 1 of the housing have been completed, and the valve seats have been surfaced and finished in the manner above described, they are disposed in endwise alignment with the inner edges of flanges 4, which are beveled at 4a, closely adjacent each other and defining therebetween a V-shaped welding trough. The notches u define slots at opposite sides of the housing, which slots are to be closed by valve guide strips, which will be referred to presently, so that the welding trough extends completely around the assembled housing sections of Figure 9, from the upper edge of one side thereof to the upper edge at the opposite side.

The valve seats define a downwardly tapering passage therebetween, which passage receives a block 7 (Figures 11 and 12) which also tapers downward, the taper of this block corresponding to the taper of the valve which the housing is intended to receive. Block 7 is provided, at the center of each side thereof, with a longitudinally extending groove 8 of rectangular or other suitable cross-section. This groove receives a correspondingly shaped guide strip 9 formed of stainless steel or other suitable alloy or metal, the guide strips being confined in the grooves 8 and between the sides of the block and the sides of the housing, so as to be accurately positioned and retained thereby during the welding operation.

Sections 1 are restrained against movement away from block 7 in a suitable manner, as by known means effective to subject the sections to pressure in the direction of the block. At this time the block contacts the valve seats, seating accurately thereon, the lower end of the block being spaced above the lower end of the body of the housing, as shown in Figure 12, the spacing of the valve seats then being sligthly less than that required by the valve. The housing sections 1 and the valve guide strips 9 are thus accurately held in assembled relation preliminary to the welding operation. Sections 1 are then welded together by welded-in metal 12 which serves to unite the adjacent ends of the sections of the housing. Also, during this welding operation, the welded-in metal penetrates into the guide strips 9 and integrally unites them with the housing sections. The notches u define slots in the sides of the housing, of approximately the same length and breadth as the guide strips. The welded-in metal penetrates the guide strips for the greater portion of the width of the outer surfaces thereof, as at 12a, Figure 11, which assures an exceptionally strong mechanical union between the guide strips and the housing, the welding of the guide strips to the housing being accomplished simultaneously with and as a part of the operation of welding together the housing sections. If desired, during the welding operation a chill strip of copper (not shown) may be disposed within the housing and overlying the line of weld extending between the lower ends of the guide strips 9. The function of this chill strip is known in the art and need not be described in detail.

After the sections 1 have been thus welded together, a ring 13, comprising a bolting flange 14, is welded to the upper end of the body of the housing, at 15, the adjacent ends of the ring and the housing body being beveled to define a V- shaped welding trough or groove, as shown. During this welding operation, the tapered wedge block 7 may remain in position. After the welding operation has been completed and the parts have cooled sufficiently, block 7 may, as a final sizing operation, be forced downward into the dotted line position of Figure 12, to a proper extent to space the valve seats accurately conformably to the valve intended to be used therewith. This also assures that the valve seats will be disposed at the proper inclination, since the taper of the block corresponds to that of the valve. Since the valve guide strips 9 are accurately formed in conformity with the guideways of the valve, and are held accurately in position during the welding operation, no machining of these guide strips is necessary. Further, the final forcing of the block 7 inwardly or downwardly a short distance between the valve seats assures that the latter and the guide strips will be disposed in accurate relation for reception of the valve.

In many instances, the heat incident to welding of ring 13 onto the top of the housing body will not be sufficient to affect the accurate relation between the valve seats and the guide strips. In such cases, if desired, the block 7 may be forced into the dotted line position of Figure 12, for finally and accurately spacing and disposing the valve seats, and then completely withdrawn from the housing, after which ring 13 may be welded on. Also, if desired, instead of effecting the final spacing of the valve seats by forcing block 7 from its full line position of Figure 12, this block may be withdrawn and replaced by a second block suitable for the purpose. This is an obvious variation of the above described method, which may be resorted to in certain instances, but I prefer, in general, to employ a single spacing block, as previously described.

It will be observed that I have shown and described valve seats disposed for cooperation with a tapered gate valve, but it will be evident that I can also use parallel seats, in which event this final spreading action which I have just described may be effected by a pair of pressure blocks which are spread under pressure.

Forging the housing sections in the manner above described is advantageous as conducive to accuracy and rapid production, with attendant relatively low cost. A further advantage of forging the housing sections is that the metal is worked and compacted so that the sections produced by forging may be relatively light while possessing adequate mechanical strength.

The extruding operation shown in Figure 3 has the advantage that the ends of the metal fibres are exposed at the beveled ends 3 of hubs 2 of the housing sections. The housing is particularly suitable for welding into a line of piping, comprising pipe ends 16 beveled to define, with the adjacent end of the housing, V-shaped welding troughs which receive welded-in metal 17. Since the ends of the metal fibres are exposed at the ends of the hubs 2, as indicated in Figure 14, and as will be clear from Figure 12, the pipe ends are welded to the ends of the metal fibres extending lengthwise of the hubs of the housing. This assures an exceptionally strong union between the pipe ends and the housing, and the hubs offer maximum resistance to tension, bending and twisting stresses to which they are subjected in use.

After the housing has been completed in the manner above described, a bonnet 18 is bolted upon flange 14, a suitable gasket being interposed between the latter flange and the flange of the bonnet. A valve stem 19 screws through the head of bonnet 18 and operates through a suitable stuffing box 20 in the lower portion of the bonnet. The lower end of stem 19 is attached to a gate valve 21 of known type, in a known manner, for relative rotation for raising and lowering the latter. A hand wheel 22 is suitably secured upon the upper end of the valve stem. The gate valve 21 is provided with guides 23 which fit about the guide strips 9 for guiding the valve during operation thereof.

What I claim is:—

1. A gate valve housing comprising two complementary sections originally formed separately and each comprising a tubular hub having its inner end inclined and forming an integral continuous valve seat, said sections being welded together along approximately the median transverse plane of the housing with said valve seats spaced apart and defining therebetween a tapered valve passage, and valve guide strips within the housing at opposite sides thereof and secured thereto by the weld between said sections.

2. The method of producing a valve housing, which comprises forming the housing in two complementary sections separated at substantially the transverse median plane of the housing, each comprising a tubular hub having an integral continuous valve seat at its inner end, surfacing and finishing said valve seats prior to securing said sections together, disposing said sections in endwise alignment, inserting a spacing block between said seats in seating contact therewith, confining valve guide strips between said spacing block and the sides of the housing so as to be accurately retained in position thereby, and welding said sections together and to said guide strips.

3. The method of producing a gate valve housing, which comprises forming the housing in two complementary sections separated at substantially the transverse median plane of the housing, each comprising a tubular hub having an integral continuous valve seat at its inner end, surfacing and finishing said valve seats prior to securing said sections together, disposing said sections in endwise alignment with said valve seats defining a passage therebetween, inserting a spacing block between said seats in seating contact therewith, welding said sections together, and after completion of the weld spreading said valve seats by pressure for final sizing thereby assuring that the latter are accurately spaced for cooperation with a correspondingly shaped and sized valve.

4. The method of producing a gate valve housing for use with a tapered gate valve, which comprises forming the housing in two complementary sections separated at substantially the transverse median plane of the housing, each comprising a tubular hub having an integral continuous valve seat at its inner end inclined substantially similarly to one seating surface of the valve, surfacing and finishing said valve seats prior to securing said sections together, disposing said sections in endwise alignment with said valve seats defining a tapering passage therebetween, inserting between said valve seats and in seating contact therewith a tapered spacing block, welding said sections together while restraining them against movement away from said block, and after completion and cooling of the weld forcing between said valve seats a block having the same taper as the valve and thereby accurately spacing and inclining said valve seats conformably to the valve.

5. The method of producing a gate valve housing, which comprises forging a cup-shaped blank provided adjacent its upper end with an outwardly extending flange inclined transversely of the blank, said blank being formed with a recess tapering toward its lower end, subjecting the resulting blank to an extruding operation by a holding die and an extruding punch entering the recess of the blank and of less diameter than the upper portion of said recess, said punch being in contact with and parallel to the side of the recess of the blank adjacent the upper portion of said flange, thereby producing an elongated tubular hub closed at its lower end and having its upper end inclined in the same direction as said flange, removing the metal from the lower end of the hub and bending said flange toward the upper end of the hub to form a housing body element projecting beyond said upper end of said hub, thereby producing one section of the housing, and welding together in endwise alignment two of said sections at the edges of said body elements and along a line corresponding to the transverse median plane of the resulting housing.

6. The method of producing a gate valve housing, which comprises forging a cup-shaped blank provided adjacent but spaced from the upper end thereof with an outwardly extending flange inclined transversely of the blank and of approximately semi-elliptical shape, said blank being formed with a recess tapering toward its lower end, subjecting the blank to an extruding operation by a holding die and an extruding punch entering the recess of the blank and of less diameter than the upper portion of said recess, said punch being in contact with and parallel to the side of the recess of said blank adjacent the upper portion of said flange, thereby producing an elongated tubular hub closed at its lower end and having its upper end inclined in the same direction as said flange, removing the metal from the lower end of the hub and bending said flange toward the upper end of the hub to form a housing body element projecting beyond said upper end of said hub, thereby producing one section of the housing, welding together in endwise alignment two of said sections at the edges of said body elements and along a line substantially corresponding to the transverse median plane of the resulting housing, and welding valve guide strips to the inner faces of said body elements, at opposite sides thereof, in the operation of welding said sections together.

7. A gate valve housing comprising two complementary sections originally formed separately and each comprising a tubular hub, said sections being welded together along a line substantially normal to the lengthwise axis of said housing with said valve seats spaced apart and defining therebetween a valve passage, and valve guide strips within said housing at opposite sides thereof and secured thereto by the weld between said sections.

8. The method of producing a valve housing, which comprises forming the housing in two complementary sections separated at substantially the transverse median plane of the housing, each comprising a tubular hub, disposing said sections in endwise alignment with valve guide strips arranged within said sections at opposite sides and at the adjacent ends thereof, and welding said sections together and simultaneously welding said guide strips to said sections.

9. The method of producing a valve housing, which comprises forging a blank with a hub portion and an outwardly extending skirt, subjecting the hub portion to an extruding operation with a punch and a holding die thereby producing an annular tubular body closed at its lower end, removing the metal from the lower end of the body so formed to produce a housing section, and welding two sections so produced together in endwise alignment along a line substantially normal to the lengthwise axis of said aligned sections.

10. The method of producing a valve housing, which comprises forging a cup-shaped blank provided with an integrally attached outwardly extended skirt, subjecting the resultant blank to an extruding operation by a holding die and an extruding punch entering the cup-portion of the blank, thereby forming an elongated hub closed at one end, bending said skirt toward the upper end of said hub to form a housing body element projecting beyond the upper end of said hub, thereby producing one section of the housing, and disposing two housing sections so produced in endwise alignment and welding them together along a line substantially normal to the lengthwise axis of said aligned sections.

11. The method of producing a valve housing, which comprises forging a cup-shaped blank provided with an outwardly extended skirt, subjecting the resultant blank to an extruding operation by a holding die and an extruding punch entering the cup portion of the blank, thereby forming an elongated hub having a disc extending across one end, bending said skirt toward the other end of said hub to form a housing body element projecting beyond said other end of said hub, thereby producing one section of the housing and disposing two housing sections so produced in endwise alignment and welding them together along a line substantially normal to the lengthwise axis of said aligned sections.

JAMES HALL TAYLOR.